United States Patent Office 3,531,827
Patented Oct. 6, 1970

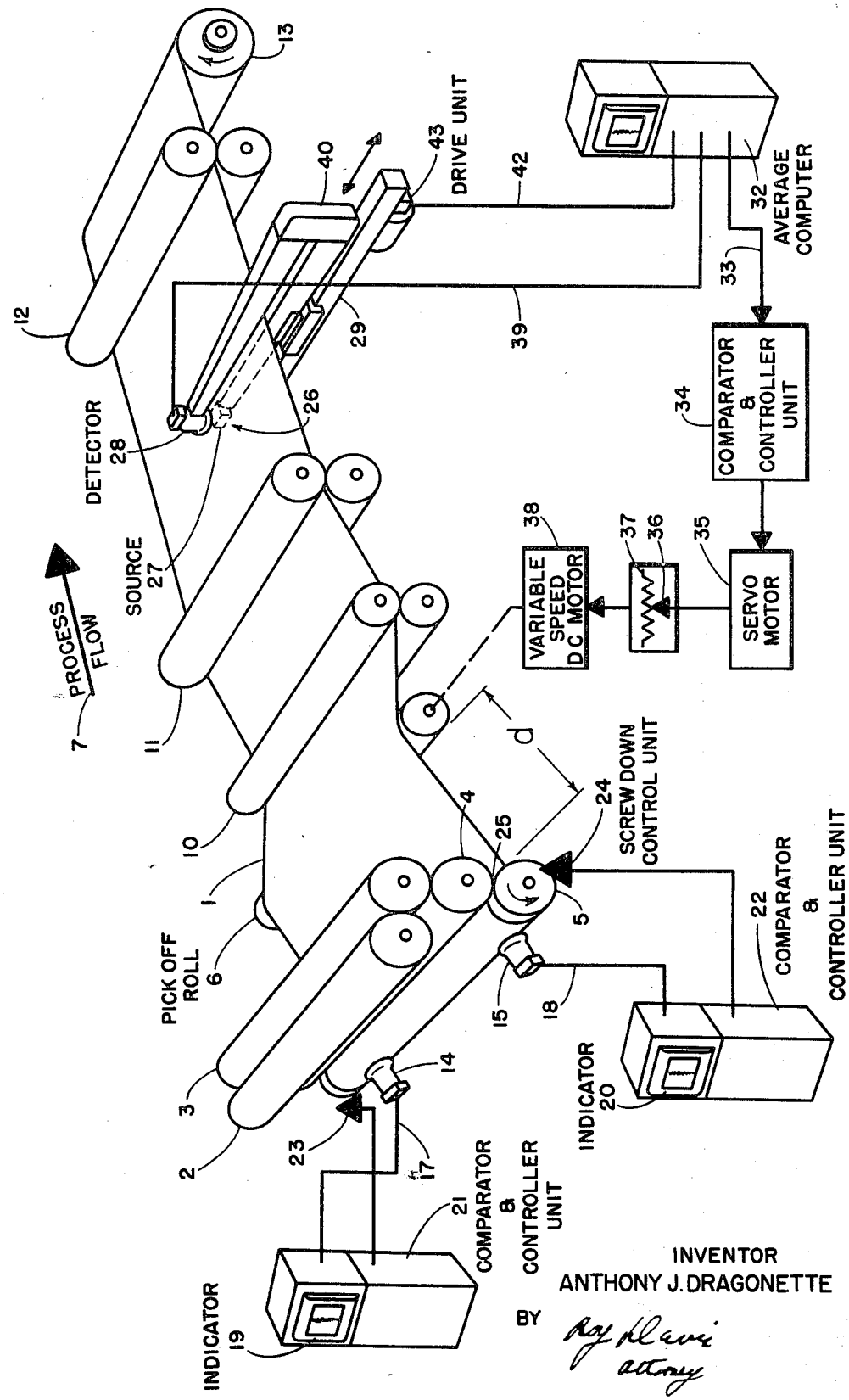

3,531,827
THICKNESS CONTROL SYSTEM FOR
CALENDERING
Anthony J. Dragonette, Stamford, Conn., assignor to
Harte & Company, Inc., New York, N.Y., a corporation of New York
Filed May 13, 1966, Ser. No. 550,040
Int. Cl. B29h 3/00; G01t 1/16
U.S. Cl. 18—2　　　　　　　　　　　　　　　6 Claims

ABSTRACT OF THE DISCLOSURE

This invention presents automatic control of plastic sheet thickness in a calendering system by varying the speed ratio between the pickoff roll and the bottom roll. During operation, a semi-liquidous plastic sheet is fed through a pair of calendering rolls, the nip of which is adjusted to determine the initial sheet thickness. A pickoff roll, which is rotated at a proportionally greater speed than the pair of calender rolls, so as to determine the final product sheet thickness, pulls the plastic sheet from the calender rolls. A gauge system which is not in contact with the plastic sheet is positioned downstream from the pickoff roll and measures the plastic sheet thickness. The gauge system generates a control signal if the measured sheet thickness deviates from the desired sheet thickness. A variable speed D.C. motor, responsive to the control signal, regulates the rotational speed of the pickoff roll to automatically maintain the plastic sheet thickness at a substantially constant value.

---

This invention relates in general to calendering process control systems and in particular to an apparatus for controlling the thickness of a process material by automatically regulating the speed ratio of the bottom calender roll and the pickoff roll.

As is well known in the art, accurate control over critical parameters of a process material within close tolerances is essential to optimum production in terms of both quality of the process material and economic feasibility. That is to say, not only must the thickness of a material be held within close tolerances for purposes of tensile strength, desired dimension accuracy, and the like, but also, due to the continuous nature of the process, maintaining minimum tolerances results in a great saving in raw material.

For example, in the manufacture of a sheet material, such as plastic and the like, it is essential to maintain the thickness of the processed material at a constant value. Present automatic control systems utilize a closed loop feedback arrangement with the production unit itself an integral part of the closed loop. Included in the feedback loop is an absorption type radiation guage situated at a predetermined point along the process material train to generate a signal as a function of the thickness of the material being processed. In an absorption type of radiation gauge, a source of penetrative radiation, such as beta rays, is disposed on one side of the material to be measured and a detector that generates an output as a function of the intensity of incident radiation is disposed on the other side of the material diametrically opposite the radioactive source. The amount of radiation absorbed by the process material is a function of the weight per unit area and when the material is homogeneous this may be expressed in terms of thickness. Accordingly, the signal output of the detector, which may be in terms of current, voltage, or mechanical displacement, is a function of the material thickness. The signal derived from the radiation guage is fed to an appropriate comparator unit where it is weighed against a standard signal representing the desired thickness. Upon a deviation, outside predetermined limits, of the measured thickness from the desired thickness, the comparator generates a control signal that actuates a screwdown mechanism. The screwdown unit operates in response to the control signal to vary the aperture (nip) between the bottom calender roll and the middle calender roll to thereby regulate the thickness of the material.

Several disadvantages and concomitant limitations are inherent in the previously described process control system. First, the profile or variations in thickness from edge to edge of the process material sheet is determined by the shape of the aperture as the sheet passes through. The shape of the aperture (nip) in turn is dependent on the amount of bending of the calender rolls resulting from pressure in calendering the stock. Thus, due to the nature of the calender holls plus the interplay between the pressure forces exerted on the material by the calender rolls and the reaction (separating) forces from the process material itself, there is an undesirable limit as to the minimum uniform sheet thickness attainable when using the previously described control system (variation in the aperture between calender rolls to determine sheet thickness). That is to say, the calender rolls upon which pressure is applied, inherently exhibit a fixed rigidity constant beyond which the calender rolls bend or deflect. During the calendering the elasticity and viscosity of the stock resist the effort of the rolls to shape it by virtue of reaction forces from the material itself. As the pressure applied to the calender rolls is increased (causing a corresponding decrease in the aperture between calender rolls which in turn determines material sheet thickness), the reaction forces (from the process material itself) also increase. These reaction forces act to separate the calender rolls and thus to increase the sheet thickness. Accordingly, to achieve the desired minimum uniform thickness excessive pressures are applied to the calender roll to override the continually increasing reaction forces. Eventually the combination of forces exceeds the calender rolls inherent rigidity constant and causes bending of the rolls. Roll bending changes the shape of the aperture between the rolls and thus results in a final product sheet having variations in thickness from edge to edge.

Two techniques of compensation for roll bending have been tried in an attempt to keep the material sheet flat (uniform thickness). In one, roll bending, an opposing bending moment (force) is applied to the ends of the calender rolls. In the other, cross axis control, one calender roll axis is crossed slightly with respect to the other by causing it to pivot about its midpoint of length.

However, both of these techniques are still limited in application by the inherent rigidity of the rolls. In addition, cross axis control is limited as to the minute area over which the control can act and roll bending control is limited, for all practical purposes, to relatively small compensation of the calender rolls.

Thus, from the above discussion it is apparent that inasmuch as prior art process control systems rely solely on varying the aperture between calender rolls (adjusted by pressure regulation on calender rolls) to control product sheet thickness, the minimum uniform product sheet thickness attainable is definitely limited.

A second disadvantage is that an increase in applied pressure to the calender rolls (to regulate sheet thickness) causes a corresponding increase in pressure on the bearings upon which the calender rolls rotate. This in turn increases the rate of bearing wear and consequently radically shortens the life of the entire control apparatus.

Still a further disadvantage of controlling material sheet thickness by solely varying the nip between calender rolls, lies in the lack of accurate control of sheet thickness in the machine direction (direction of travel of the material). Controlling sheet thickness by varying the nip between calender rolls regulates the average thickness across the material sheet but does not provide equal and sufficient control over machine direction sheet thickness.

Accordingly, it is an object of the present invention to overcome the limitations and shortcomings exhibited by presently used calender process control systems.

Another object of the present invention is the provision of a calender system that regulates material sheet thickness by automatically controlling the speed ratio between the bottom calender roll and the pickoff roll.

Still a further object is the calendering of sheet materials having a minimum thickness heretofore unobtainable.

Still a further object is the provision of a calender process control apparatus characterized by an extremely long life.

Another object of the present invention is the provision of an apparatus that can use much lighter, by weight, calender rolls than was heretofore possible.

Another object of the present invention is the provision of an apparatus that enables more effective use of present roll bending and cross axis control.

Another object is to permit the use of calender rolls and attendant parts and equipment of simpler design operating at less stringest specifications.

Still a further object is the automatic control of material sheet thickness in the machine direction.

Another object is an increase in sheet material productivity.

Still a further object is the enhancement of translucent properties of a sheet material as well as tear resistance in the traverse direction.

Briefly, the present invention contemplates automatic control of plastic sheet thickness in a calendering system by varying the speed of the pickoff roll with respect to the bottom roll. A semi-liquidous plastic sheet is fed through a pair of calender rolls the nip of which is adjusted to determine the initial sheet thickness. A pickoff roll, which is rotated at a proportionally greater speed than the pair of calender rolls, so as to determine the final product sheet thickness, pulls the plastic sheet from the calender rolls. A non-contacting gauge system, positioned downstream from the pickoff roll, measures the plastic sheet thickness and generates a control signal if the measured sheet thickness deviates from the desired sheet thickness. A variable speed D.C. motor, responsive to the control signal, regulates the rotational speed of the pickoff roll to automatically maintain the plastic sheet thickness at a substantially constant value.

Further objects and advantages of the present invention will become apparent from the following specification when read in connection with the accompanying drawing, in which:

The figure is a perspective showing of a calender process system for automatic regulation of material sheet thickness in accordance with the present invention.

With reference now to the drawing a plastic material or the like in a semi-liquidous state is initially fed through a combination of calender rolls namely, offset roll 2, top roll 3, middle roll 4, and bottom roll 5, to form a sheet of plastic material. Each of the above calender rolls is driven by suitable power drive means (not shown) at a predetermined rotational speed. Plastic material sheet 1 is pulled from bottom calender roll 5 by pickoff roll 6 and fed through the remainder of the process system, which includes an embosser station 10, a first cooling station 11, a second cooling station 12, and a windup roll 13, in the direction of arrow 7. The rotational speed of windup roll 13 is controlled by a conventional drive means (not shown) in a manner well known in the art.

A pair of backscatter radiation gauges 14 and 15 are situated on a common line along an edge of bottom calender roll 5 to measure the thickness of the plastic material as it passes around an arc of bottom roll 5. As is well known in the art, a backscatter type of radiation gauge comprises a radiation source and detector which are mounted on the same side of the process material being measured, the intensity of reflected or backscattered radiation being proportional to the weight per unit area and hence, thickness of the scattering material when the material is homogeneous. In accordance with the principles of the present invention backscatter gauge 15 is mounted in a fixed position on the front side of bottom roll 5 while backscatter gauge 14 is mounted in a fixed position on the back side of bottom roll 5. The signal output of backscatter radiation gauge 15 is fed by means of electrical cable 18 to signal indicator unit 20 and then to comparator and controller unit 22. Signal indicator unit 20 provides visual indications of variations in the process material thickness as a function of time. The signal output of backscatter gauge 14 is fed through electrical cable 17 to a signal indicator unit 19, where variations in thickness of the process material are also visually indicated, and then to comparator and controller unit 21. A suitable type of comparator and controller unit which may be employed in the present invention is described in detail in U.S. Pat. No. 3,010,018 of Ziffer, issued Nov. 21, 1961 and entitled Control System. Briefly, in comparator and controller units 21 and 22, respectively, the signal output of each backscatter radiation gauge is compared with a standard signal representing the optimum (desired) thickness of the material at this point in the process system. When the measured value differs from the desired material thickness (outside predetermined limits) comparator and controller unit 21 generates a control signal that is fed to a screwdown control apparatus 23 while comparator and controller unit 22 generates a control signal that is applied to screwdown control apparatus 24. Screwdown control elements 23 and 24 are conventional in the art and generally comprise high speed screwdown motors in conjunction with gear combinations which operate to apply pressure to a calender roll.

The plastic sheet of material 1 is seen to flow through the jaws of an automatic standardizing absorption type radiation gauge 26 located between first cooling station 11 and second cooling station 12. Absorption radiation transducer 26 acts to measure the windup thickness of the plastic sheet of material in a manner previously described. The gauge 26 includes a C frame 40 with a beta radiation source 27 mounted on the extremity of the lower arm and a radiation detector head 28 mounted on the extremity of the upper arm. The plastic material sheet 1 is arranged to pass through the arms of the C frame 40 so that source 27 is disposed on the under side of the sheet 1 and detector head 28 is situated on the upper side of sheet 1. Since the plastic sheet 1 to be measured is several feet in width while the radiation source 27 and detector 28 are, relatively speaking, point elements, the gauge 26 is slideably mounted on a carrying beam 29 in a manner suitable for scanning source 27 and detector head 28 across the width of the plastic material sheet 1. A drive unit 43 provides for automatic scanning back and forth across the width of the plastic sheet. Limit switches or other suitable means (not shown) located in detector head 28 provide signals indicating the beginning and end of the plastic material sheet width. This latter information together with a signal proportional to the material sheet thickness (windup thickness) is coupled through electrical cable 39 to an average computer 32. The operation and detailed construction of average computer 32 is described in U.S. Pat. No. 3,067,939 of Ziffer, issued Dec. 11, 1962 and entitled Control System. In general, in addition to giving a visual indication of the variations in material sheet thickness, average computer 32 determines the average value of the signal provided by detector head 28 for a period of time corresponding to the time required for the transducer to scan across the width of the process material sheet, this time being indicated by the signals from the limit switches located in detector head 28. The computed average value is then compared to a standard signal representing the desired windup sheet thickness in comparator and controller unit 34, which is the same type as aforedescribed comparator units 21 and 22. If the average value is different from the signal representing the desired thickness, comparator and controller unit 34 generates a control signal that is coupled to a servo motor 35. Servo motor 35 in turn drives variable position arm 36 of vernier rheostat 37. Vernier rheostat 37 is connected to a variable speed D.C. motor 38 in a manner so as to control the voltage that is applied to D.C. motor 38 and thus regulate its rotational speed. It will be evident to those skilled in the art that vernier rheostat 37 may be inserted in either the armature circuit or field circuit or other control circuits of D.C. motor 38. Variable speed D.C. motor 38 is mechanically coupled (indicated by the dotted line) to pick off roll 6. Consequently the rotational speed of pick off roll 6 is governed by the speed of D.C. motor 38.

Having described the interconnection of the various elements, the operation of the process system will now be discussed.

A process material such as plastic or the like, is passed from some type of extruder (not shown) in a semi-liquidus state into the space between offset calender roll 2 and top calender roll 3. The plastic material is fed through the top and middle calender rolls 3 and 4 and then passed through nip 25 and wrapped around the back edge of bottom calender roll 5. The aperture (nip 25) between the bottom roll 5 and middle roll 4 is initially set to a predetermined value. Since the plastic sheet passes through nip 25, the nip determines the initial sheet thickness as it passes around bottom calender roll 5. As the plastic sheet passes over bottom roll 5, backscatter gauges 14 and 15, respectively, measure the material thickness and feed signals proportional to the thickness over electrical cables 17 and 18 to comparator and controller units 21 and 22, respectively. As previously described, if there is a deviation from the desired thickness at this point in the calendering system, comparator and controller units 21 and 22 generate control signals which are fed to screwdown control units 23 and 24, respectively. These control units act to decrease or increase the pressure on bottom roll 5 in accordance with the control signal to thereby automatically vary the nip 25 so as to continually maintain the process material, as it passes over the bottom roll 5, at the desired thickness.

Pickoff roll 6, which ordinarily is rubber surfaced to provide positive friction with the plastic sheet, pulls the sheet of process material away from bottom roll 5. In accordance with the principles of the present invention, pick off roll 6 is rotated at a proportionally greater speed than the rotational speed of bottom roll 5. For example, the rotational speed ratio between pick off roll 6 and bottom roll 5 may be 2:1. Inasmuch as the pick off roll 6 rotates at a greater speed than bottom roll 5, a stretching force (increase in tension) acts along the plastic material in the interval $d$ between pick off roll 6 and bottom roll 5. Since the plastic material is in a semi-liquidus state at this point, the stretching force results in a stretching of the process material and thereby decreases the thickness of the plastic material sheet as it is pulled away from bottom roll 5. Accordingly, by adjusting screwdown control units 23 and 24 so as to set aperture 25 to an initial predetermined value and maintaining exact control of the speed differential between pick off roll 6 and bottom roll 5, a uniform product material sheet of any desired minimum thickness can be produced. For instance, if the nip between bottom roll 5 and middle roll 4 is set so as to form a material sheet with a thickness of 4 mills, by driving the pick off roll 6 at twice the speed of bottom roll 5 a final product material sheet of 2 mills is produced on windup roll 13.

The desired pulloff speed of pick off roll 6 is continually and automatically controlled by automatically regulating the speed of variable D.C. motor 38, in accordance with the average thickness of the final product material sheet. That is to say, as the material sheet 1 flows through the jaws of radiation gauge 26, detector head 28 sends a signal proportional to the material sheet thickness to average computer 32. As previously discussed, computer 32 determines the average thickness of the material sheet in the transverse direction and couples a signal proportional to this average to a comparator unit where it is compared to a standard signal representing desired sheet thickness. If the measured sheet thickness is greater than the desired thickness, comparator 34 generates a control signal, whose magnitude and sense corresponds to the deviation, that is fed to servo motor 35. Servo motor 35 responds to the control signal to move moveable arm 36 along vernier rheostat 37 in such a direction as to increase the voltage applied to D.C. motor 38. This additional voltage causes an increase in the speed of D.C. motor 38 and a corresponding increase in rotational speed of pick off roll 6. Of course, the increase in rotational speed of pick off roll 6 varies the stretching force acting along the material sheet in interval $d$ and results in a decrease in material sheet thickness. Conversely, if the measured sheet thickness is below the desired thickness, comparator 34 generates a control signal which acts through servo motor 35 to move the position of moveable arm 36 of vernier rheostat 37 in direction to decrease the voltage that is applied to D.C. control motor 38. Accordingly the speed of D.C. motor 38 is decreased which causes a corresponding decrease in rotational speed of pick off roll 6. This decrease in the rotational speed of pick off roll 6 lessens the stretching force acting along the material sheet in interval $d$ and results in a thicker product sheet of material.

It should be noted that the gauging system is designed to automatically carry out a repetitive cycle of scanning operation so as to provide a continuous control of plastic sheet thickness. That is, a timing unit (not shown, for simplicity) in the average computer establishes a delay equivalent to the time required for the plastic sheet to travel from the control point of the non-contacting radiation gauge and then sends a signal through cable 42 to the drive unit 43 to initiate a new scan cycle. Thus a continuing sequence of measurement, correction and measurement is maintained.

The numerous advantages of the present invention are readily apparent from the foregoing description. By virtue of regulating the speed ratio of the bottom calender roll and pickoff roll to determine sheet thickness, complete dependency upon aperture variation between a pair of calender rolls to control sheet thickness is eliminated. Consequently excessive pressures upon calender rolls are not required and problems prevelant in prior calendering systems such as roll bending, are eliminated. Furthermore, this means that now lighter and less expensive calendar rolls may be used. Additional advantages include automatic control over machine direction thickness of a continuous sheet, increase in transverse tear resistance characteristics of a material sheet, enhancement of translucent qualities and increase in total product sheet production per unit time as well as production of final sheet materials having a uniform minimum thickness heretofore not possible.

In connection with the foregoing description of the preferred embodiment of the present invention, specific rotational speed ratios and product sheet thickness have been used by way of example only. For instance, while the speed ratio of the pickoff roll and bottom calender roll has been illustrated at 2 to 1, it may be 10 to 1, 100 to 1 or as high as the nature of the process material sheet will permit. Also, inasmuch as it is the speed ratio between the rolls which is fo primary importance, the output of the D.C. motor 38 could control the rotational speed of a roll other than the pickoff roll 6, such as bottom roll 5. Furthermore, the back-scatter radiation gauges situated adjacent to the bottom calender roll may be made moveable across the width of the material sheet instead of mounted in a fixed position. In the alternative a backscatter gauge may be mounted in a fixed position at the center of the bottom calender roll. In addition, the process system may include a conventional roll bending element responsive to either the control signals generated by comparator 34, comparator 21 or comparator 22. That is the cross-axis or roll bending control may be effected either from a signal generated by a radiation gauge situated so as to measure the final product sheet thickness or from a radiation gauge or combination of the same situated adjacent to and cooperating with the bottom calender roll. Those skilled in the art may make numerous other modifications of and departures from the specific apparatus described herein without departing from the disclosed inventive concepts. Accordingly, the invention is to be construed as limited only by the spirit and scope of the appended claims.

What is claimed is:

1. A control system associated with a calendering apparatus to regulate automatically the thickness of a plastic sheet as it is pulled from a set of calender rolls by a pickoff roll comprising:
   (a) A set of calendering rolls for rough sizing of the plastic sheet automatically responsive to a screwdown control unit, said unit receiving a signal representing any difference between a signal of a non-contacting back-scatter radiation measuring means giving the thickness of the plastic sheet and a standard signal representing the desired thickness of the plastic sheet,
   (b) measuring means located downstream from the set of calendering rolls and the pickoff roll and adapted to provide an output signal as a function of the thickness of the sheet,
   (c) comparators means connected to said measuring means to provide a control signal corresponding to the magnitude of difference between said output signal and a standard signal representing the desired thickness, and
   (d) regulation means responsive to said control signal and connected to at least one of the rolls for controlling the rotational speed ratio between the calender rolls and the pickoff roll so as to automatically control the final sheet thickness, the controlling of thickness being due to the degree of lateral stretching of the plastic sheet as the rotational speed ratio between the calendar rolls and the pickoff roll varies.

2. A calendering control system as defined in claim 1 wherein said regulation means comprises a variable speed D.C. motor whose speed is regulated by the amount of applied voltage and means responsive to said control signal to regulate the amount of voltage applied to said D.C. motor.

3. A calendering control system as defined in claim 1 wherein the measuring means includes a transducer, drive means to scan said transducer in a transverse path across said sheet and computer means connected to said transducer and adapted to provide an output signal representing the average thickness of said sheet as said transducer scans across the sheet.

4. A calendering control system as defined in claim 1 wherein said measuring means comprises a non-contacting radiation gauge slideably mounted on a carrying beam to transversely scan across said sheet.

5. A calender control system as defined in claim 1 wherein said regulation means is connected to said pickoff roll.

6. A control system associated with a calendering apparatus for automatically controlling the machine direction thickness of a final product material sheet as it is pulled from first and second cooperative calender rolls by a pickoff roll comprising: first and second non-contacting backscatter radiation gauges to generate first and second output signals, respectively, proportional to the material sheet thickness as the sheet passes through the aperture between the calender rolls, said first backscatter radiation gauge mounted in a fixed position at the one end of said second calender roll and said second backscatter radiation gauge mounted in a fixed position at the other end of said calender roll; a first comparator means connected to said first backscatter radiation gauge to provide a first control signal; a second comparator means connected to said second backscatter radiation gauge to provide a second control signal; said first and second control signals corresponding to the magnitude of difference between said first and second output signals and a standard signal representing the desired sheet thickness at this point in the process system; first control means located at the one end of said second calender roll and second control means located at the other end of said second calender roll, said first and second control means responsive to said first and second control signals, respectively, to vary the nip between said first and second calender rolls; a non-contacting radiation gauge located downstream from said pickoff roll and adapted to generate a third output signal as a function of the thickness of said material sheet; drive means to scan said radiation gauge in a transverse path across said material sheet; computer means connected to the output of said non-contacting radiation gauge to provide a fourth output signal representing the average thickness of said material sheet; third comparator means connected to the output of said computer means for generating a third control signal corresponding to the magnitude of difference between said fourth output signal and a standard signal representing the desired sheet thickness and regulation means responsive to said third control signal and connected to at least one of said rolls for controlling the rotational speed ratio of said rolls to automatically control the final product material sheet thickness.

References Cited
UNITED STATES PATENTS

| | | |
|---|---|---|
| 3,049,036 | 8/1962 | Wallace et al. |
| 2,988,641 | 6/1961 | Gough. |
| 3,000,438 | 9/1961 | Alexander. |
| 3,084,314 | 4/1963 | Ziffer. |
| 3,091,800 | 6/1963 | Gould et al. |

ARCHIE R. BORCHELT, Primary Examiner

U.S. Cl. X.R.

250—83.3